United States Patent [19]

Kaiser et al.

[11] Patent Number: 4,574,265

[45] Date of Patent: Mar. 4, 1986

[54] SYSTEM FOR MONITORING THE SENSOR RESPONSIVE TO A PERIODIC CONDITION IN AN INTERNAL COMBUSTION ENGINE

[75] Inventors: Günther Kaiser, Stuttgart; Werner Nitschke, Ditzingen, both of Fed. Rep. of Germany

[73] Assignee: Robert Bosch GmbH, Stuttgart, Fed. Rep. of Germany

[21] Appl. No.: 481,859

[22] Filed: Apr. 4, 1983

[30] Foreign Application Priority Data

Apr. 3, 1982 [DE] Fed. Rep. of Germany ....... 3212561

[51] Int. Cl.⁴ ............................................. B60Q 1/00
[52] U.S. Cl. ............................ 340/52 R; 123/195 D; 123/494; 364/431.01
[58] Field of Search ............ 340/52 R, 52 F; 73/115; 123/198 D, 494; 364/431.01

[56] References Cited

U.S. PATENT DOCUMENTS

| 4,369,660 | 1/1983 | Lentz et al. ........................ 73/115 X |
| 4,388,825 | 6/1983 | de Valpillieres ....................... 73/115 |
| 4,475,381 | 10/1984 | Nakatomi et al. ..................... 73/115 |
| 4,525,781 | 6/1985 | Konomi ................................. 73/115 |

Primary Examiner—John W. Caldwell, Sr.
Assistant Examiner—Michael F. Heim
Attorney, Agent, or Firm—Frishauf, Holtz, Goodman & Woodward

[57] ABSTRACT

A sensor for the variable underpressure in the intake manifold of an engine produces a digital output signal which is sampled at intervals of one half of the period of pressure variation or an odd multiple of such half period, as timed in synchronism with the crankshaft revolution in a phase relation designed to intercept maximum and minimum values of pressure. The two most recent samples are stored in a shift register and their difference is formed by digital subtraction, compensated for changes of sign in successive difference operations to provide an absolute difference value output. The latter is then provided to a threshold stage which provides an output signal if the difference value does not reach a predetermined threshold. The signal of the threshold stage is integrated before it is used to produce an alarm indication or a corrective control function. When such an indication is produced, the value of pressure measured by the sensor is referred to in order to determine whether the malfunction relates to the communication of the vacuum to the sensor or to a defect in the sensor itself.

7 Claims, 2 Drawing Figures

SYSTEM FOR MONITORING THE SENSOR RESPONSIVE TO A PERIODIC CONDITION IN AN INTERNAL COMBUSTION ENGINE

This invention concerns a sensor, such as a sensor for the intake vacuum of an internal combustion engine, which is responsive to a physical magnitude that varies in step with the rhythm of operation of the engine.

It is well known to control the operation of internal combustion engines with reference to operating parameters which are sensed by sensing devices appropriately located in or on the engine. Measurements made by such sensors for engine control purpose are for example the underpressure in the intake manifold (generally referred to as the intake vacuum), the rate of air taken in, the combustion chamber pressure, the light produced in the combustion chamber, and the like. The signals produced by the sensors are supplied to an electronic control apparatus that generates positioning magnitudes for operating the positioning devices or timing shift adjustments for engine control, for example of the ignition system, fuel injection system, supercharger or the like.

In order to assure reliable operation of such engine control, it is necessary to monitor the function of the sensors used. It is known for that purpose to provide redundant sensing and measuring systems in which two or more sensors are provided in parallel to each other and an alarm function is set off in the case of deviation of the output of one sensor from the other or others. Such precautions are, however, necessarily connected with extensive expense.

THE INVENTION

It is an object of the present invention to provide a system for monitoring engine sensors that does not require the use of multiple sensors to guard against or indicate sensor malfunction, and that does not involve nearly as much cost as would be required by the use of multiple sensors.

Briefly, the sensor output is sampled at intervals of a half-period, or odd multiple thereof, of the cycle of variation of the physical magnitude which the sensor normally measures. The two most recent samples thus obtained are stored and compared, and the absolute magnitude of their difference is continuously measured to provide a signal which is supplied to a threshold circuit that produces an output when that absolute value of difference fails to exceed a predetermined value. This signal is used to produce a warning indication, and it may be useful to provide a supplementary indication when the physical value measured by the sensor is outside the range of normal variation during engine operation and, at the same time, the difference value fails to reach the prescribed threshold.

The sample timing is preferably synchronized with a reference mark generator driven by the engine crankshaft.

The invention has the advantage that only a single sensor for any particular parameter is necessary and the monitoring of the sensor signal and of the sensor can readily be implemented by functions already present or easily incorporated into the electronic engine control apparatus with which the sensor works.

THE DRAWING

The invention is further described by way of illustrative example with reference to the annexed drawing, in which:

FIG. 1 is a graphical representation of an example of a physical magnitude to be measured by a sensor which is to be monitored in accordance with the invention, and FIG. 2 is a block circuit diagram of an embodiment of the monitoring system according to the invention.

DESCRIPTION OF THE ILLUSTRATED EMBODIMENT

Figure 1:
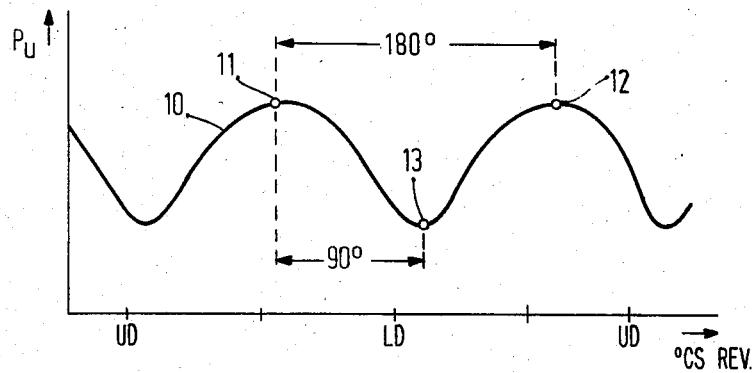

FIG. 1 shows a graph plotting the underpressure $P_u$ in the intake manifold of an internal combustion engine plotted against the crankshaft angle °CS. This underpressure $P_U$ is an example of a physical magnitude measureable by a sensor which is monitored in accordance with the invention. In FIG. 1 there are marked on the crankshaft angle axis the upper deadpoint UD and the lower deadpoint UT of the engine, which for the purpose of this example, is a four-cylinder engine in which two cylinders are fired in each revolution of the crankshaft, so that the pistons in two cylinders reach the upper and lower deadpoints at the moments marked in FIG. 1, and the other two pistons have exactly the reverse motion.

As is visible in FIG. 1, the curve 10 of the underpressure $P_u$ has maxima 11 and 12 and minima of which one is shown at 13. In a four-cylinder machine as above mentioned, each intake valve operates at from 10° to 15° before the upper deadpoint and closes about 40° to 60° after the lower deadpoint. Since inbetween the deadpoints the pistons are moving in the cylinder at maximum velocity, the greatest suction and underpressure occurs there and the underpressure reaches its minimum near the deadpoints, but actually somewhat following them, because of the lag between the conditions in the cylinder and at the location of the sensor. In a four-cylinder engine as described, the spacing between successive maxima 11 and 12, and likewise between successive minima, corresponds to 180° CS.

In accordance with the invention, the signal illustrated in FIG. 1 is sampled at spacings of 90° CS, and in the preferred embodiment of the invention this sampling takes place, by virtue of the design of the sample synchronizing system, at successive points 11, 13, 12, which are alternately maxima and minima. The measured values at the points 11 and 13 must normally have a substantial difference. Then, if it should appear that at the points 11 and 13 values are measured that are identical or nearly the same, a defect is present. If the value measured by the sensor lies in the range of atmospheric pressure, a failure in the connection between the pressure sensor and the intake manifold has presumably occurred. If the measured pressure is at some value of vacuum differing substantially from atmospheric pressure, a defect in the pressure sensor itself is probable.

For the successive samples of the measured underpressure to differ as much as possible, it is not necessary for them to be spaced by half of the period of one cycle of pressure variation, as in the example just mentioned, since essentially the same result can be produced a little less quickly and a little less often by sampling at one-and-a-half or two-and-a-half times the period of pressure variation, thus at any odd number of halves of the period.

Figure 2:
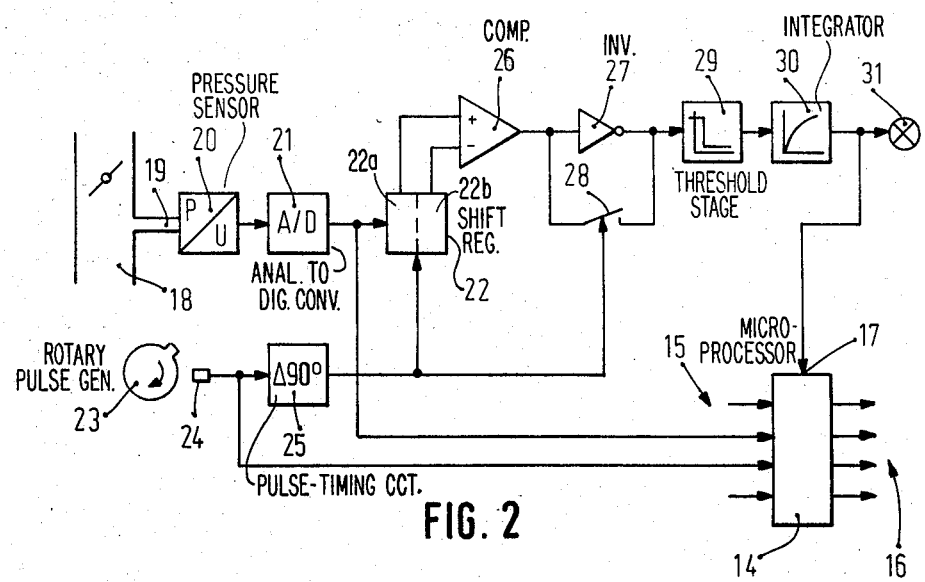

FIG. 2 shows the block circuit diagram of an embodiment of a system according to the invention. There is shown an intake pipe 18 of an internal combustion engine which is connected with a pressure sensor 20 through a branch pipe 19. The output signal of the pressure sensor 20 is supplied to an analog-to-digital converter 21 which furnishes a digital output to a shift register 22. FIG. 2 also shows a reference mark generator 23 which is associated with the crankshaft which produces the revolution of a rotary reference mark 23 to which the reference mark sensor 24 responds. The latter is connected to a timing circuit 25 that generates control pulses at a spacing from each other of 90° of crankshaft rotation. The pulses of the timing circuit 25 are provided, on the one hand to clock the shift register 22 and on the other hand to operate the switch 28. The two places 22a and 22b of the shift register 22, in each of which a digital measure value is stored during operation of the system, are connected to the input of a subtracting circuit 26 which provides an output corresponding to the difference between the two values stored in the shift register 22. The output of the subtracting circuit 26 then proceeds through an inverter which is arranged to be bypassed (and cut out) by a switch 28, to a threshold stage 29. The output of the threshold stage 29 leads to an integrating circuit 30, the output of which is furnished to a control apparatus 14 and also to an indicator 31. The control apparatus 14 receives various input signals for engine control at inputs 15 and provides various output signals at outputs 16 for control mechanisms (not shown) of the engine.

The manner of operation of the system of FIG. 2 will now be described.

At the output of the analog-to-digital converter 21 there are provided quasi-continuously in digital form the contemporaneous measured value of the curve 10 of FIG. 1. At intervals of 90° of crankshaft revolution, the shift register 22 is advanced, so that the value at points 12,13 or 13,11—successive samples values in any case—are stored respectively in the two places of the shift register 22. The successive values are subtracted one from the other in the subtraction circuit 26, while the different polarity (sign) of successive difference signals is compensated for by the cyclically actuated switch 28 by-passing the inverter 27, so that alternate difference determinations are reversed, and the output provided to the threshold circuit 29 represents the absolute value of the difference. In normal operation of the pressure sensor, therefore, there will be continuously presented to the threshold stage 29 a value that is clearly greater than zero. If this value fails to reach a minimum threshold value set in the stage 29, a signal appears at the output of the stage 29. The latter could be furnished directly to an indicator, but preferably it is integrated by a circuit 30, which may be as simple as an RC coupling network, so that only after several successive signals at the output of the stage 29 produced by successive difference values at the output of the subtractor 26 the indicator 31 for the input 17 of the control apparatus 14 are activated. If the input 17 of the control apparatus is activated, the latter switches over to an emergency function, so that the engine cannot suffer damage.

In a further development of the invention, provision is made for determining the absolute value of the output signal of the sensor 20 at every occasion of the activation of the input 17, by means of a connection of the output of the analog-to-digital converter 21 to the control circuit 14. If the value measured directly by the sensor 20 is of the order of magnitude of atmospheric pressure, a failure in the line 19 is probably present, whereas some other value measured by the sensor 20 indicates a failure in the sensor 20 itself. The difference detected conditions can be made clear by the provision of an indicator 31 capable of producing two or more kinds of warning indications.

Although the invention has been described with reference to a particular illustrative example, it will be recognized that variations and modifications are possible within the inventive concept.

We claim:

1. System for monitoring a sensor of an internal combustion machine when the sensor is responsive to a physical magnitude that varies periodically in step with the operating rhythm of the engine, comprising:

a transducer included in said sensor for producing an electrical output signal representative of said periodically varying physical magnitude;

a timing device (25) for periodically sampling said transducer output signal at intervals equal to an odd multiple, including unity, of one half of the period of a cycle of said periodic physical magnitude ($P_u$) and for thereby producing a sequence of output pulses representative of the magnitudes of time samples of said transducer output signals;

means (22, 26) for continuously measuring the difference between the magnitudes represented by successive pulses of said sequence and providing an output corresponding thereto, including shift register storage means (22) having an input connected to the pulse output of said timing device (25) and and comparison means (26) connected to said storage means;

means (27,28) for compensating for the alternating reversals of the sign of the differences measured by said difference measuring means (26) in successive difference measurements, and thereby providing an output signal representative of the absolute value of successive differences measured by said difference measuring means (26), and means for comparing said absolute value output signal with a reference signal of predetermined value, for producing a warning signal when said absolute value signal persistently remains smaller than said reference signal.

2. System according to claim 1, in which said warning signal producing means includes integration means for producing said warning signal only when said failure of said absolute value to exceed said reference signal is persistent.

3. System according to claim 1, in which said timing device (25) is synchronized by a reference mark generator (23) driven by said engine.

4. System according to claim 1, in which said compensating means includes a switching device (28), the operation of which is timed by said timing device (25).

5. System according to claim 1, in which said transducer output signal is also furnished to an evaluation circuit (14) which is also responsive to said warning signal for controlling indicating or corrective equipment in a manner dependent upon the contemporaneous value of said transducer output signal.

6. Method of monitoring the operation of a sensor disposed for measuring, in an internal combustion engine, a physical magnitude which varies in step with the rhythm of operation of said engine, comprising the steps of:

obtaining, by means of a timing device synchronized with the rate of revolution of said engine, samples of said measured magnitude spaced in time by an odd number (including one) of halves of the period of one cycle of variation of said physical magnitude;

continuously storing the two most recent successive samples of said physical magnitude obtained as aforesaid;

measuring the difference between said two stored samples of said measured magnitude;

continuously obtaining the absolute value of the measured difference between said successive samples by compensating for alternations in the sign of said difference;

comparing said absolute value of said difference continuously with a predetermined value thereof for obtaining a signal indicative of the failure of said absolute difference value to exceed said predetermined value;

integrating said indicative signal to provide an output indicative of a persistent failure of said difference value to exceed said predetermined value, and operating an indicating device in response to said output.

7. Method according to claim 6, in which upon the occurrence of said output indicating a persistent failure of said difference signal to exceed said predetermined value, reference is made to the contemporaneous magnitude of said physical value measured by said sensor for determining whether a supplemental indication should be provided.

* * * * *